C. H. HARDY.
Apparatus for the Manufacture of Soap.
No. 64,099.
2 Sheets—Sheet 1.
Patented April 23, 1867.
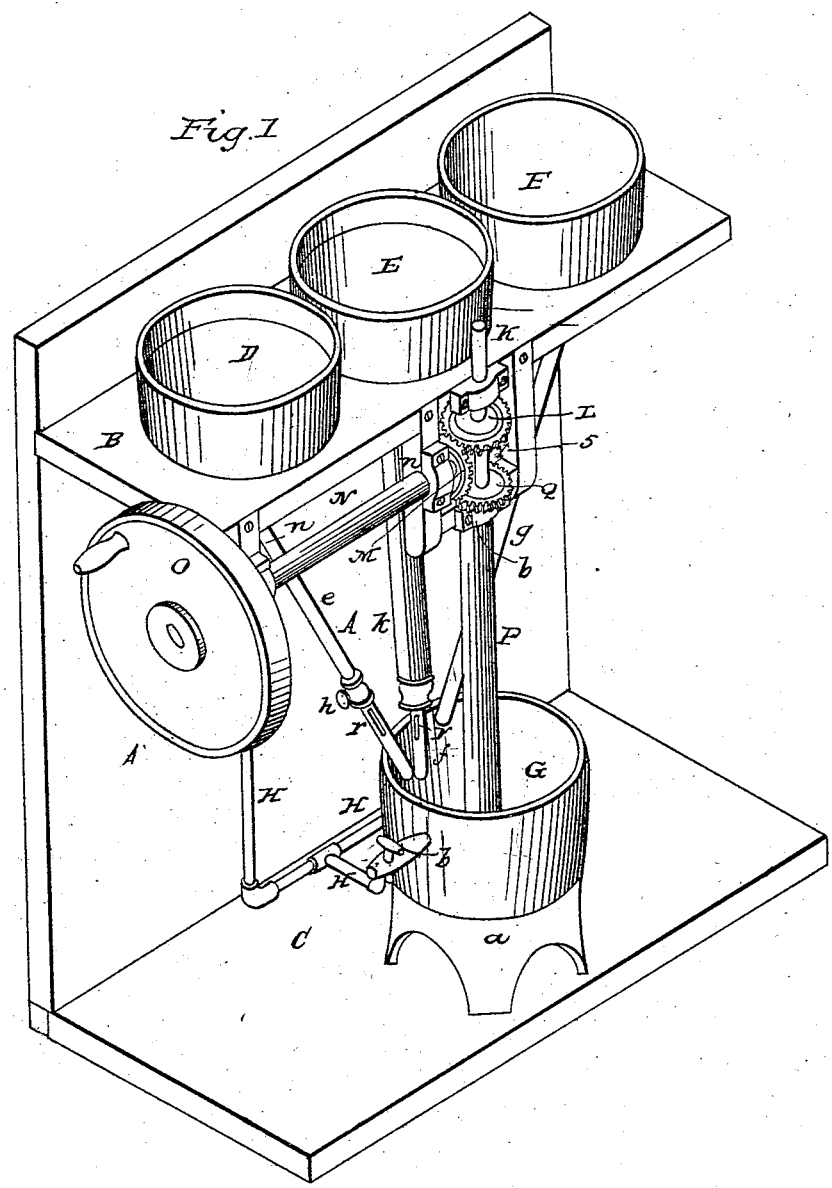

2 Sheets—Sheet 2.
C. H. HARDY.
Apparatus for the Manufacture of Soap.
No. 64,099.
Patented April 23, 1867.
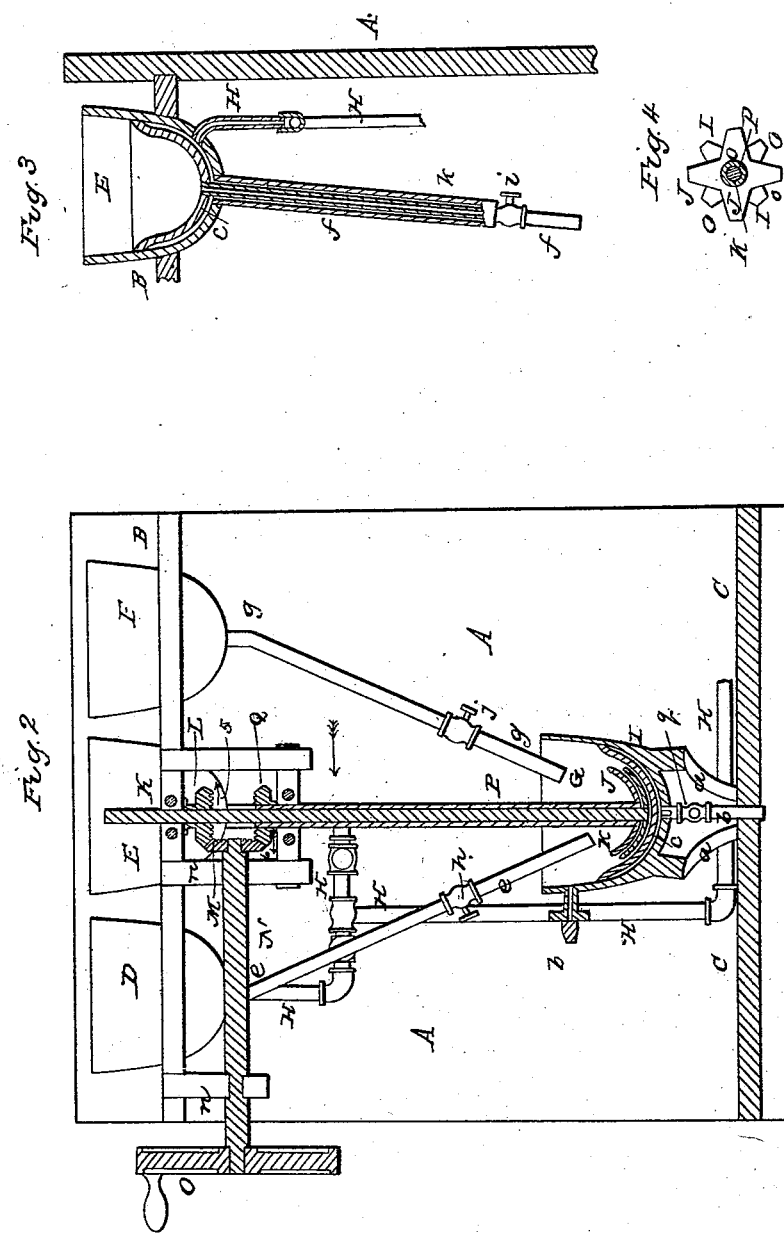

ns di# UNITED STATES PATENT OFFICE.

CYRUS H. HARDY, OF CHARLESTOWN, ASSIGNOR TO HIMSELF AND GEORGE JAQUES, OF BOSTON, MASSACHUSETTS.

IMPROVED APPARATUS FOR THE MANUFACTURE OF SOAP.

Specification forming part of Letters Patent No. 64,099, dated April 23, 1867.

*To all whom it may concern:*

Be it known that I, CYRUS H. HARDY, of Charlestown, in the county of Middlesex and State of Massachusetts, have invented certain Improvements in the Manufacture of Soap, of which the following is a full, clear, and exact description, reference being had to the accompanying drawings making part of this specification, in which—

Figure 1 is a perspective view of my apparatus for making soap. Fig. 2 is a longitudinal vertical section through the same. Figs. 3 and 4 are sectional details to be referred to.

In the ordinary process of making soap it is customary to boil the ingredients for a number of days in one kettle, when they are baled out and poured into another containing a pickle of salt and water and boiled again, and then left to settle. To economize much of the time and labor involved in these operations, and to produce a superior quality of soap by a method free from the inconvenience and dirt incident to the old process, is the object of my invention, which consists in placing the several soap-forming ingredients in separate and independent receptacles, with or without steam-jackets, and provided with pipes which conduct the ingredients to the kettle in which they are heated, the supply of the ingredients thereto being regulated by suitable stop-cocks or valves, and agitators being placed within the said kettle, in order that its contents may be thoroughly mixed and incorporated together.

To enable others skilled in the art to understand and use my invention, I will proceed to describe the manner in which I have carried it out.

In the said drawings, A represents the side or wall of a building, and B C the floors of the same. Within the upper floor B, and at equal distances apart, are placed receptacles D E F, the bottoms of which project below the under side of the floor. Upon the lower floor C stands a tripod, *a*, for supporting a kettle or receptacle, G, provided with a faucet, *b*. The receptacles D E G are each provided with an exterior casing or jacket forming a chamber, *c*, with which communicate pipes H, for the introduction of steam thereto. The receptacle F has no jacket, and from its bottom and the bottoms of the receptacles D E proceed pipes *e f g*, provided with stop-cocks *h i j*, by means of which the supply of the contents of these receptacles may be regulated as desired, the pipes extending down to various depths into the receptacle G, for a purpose now to be explained. The receptacle D contains grease; the receptacle E, melted rosin; and that, F, contains a lye, consisting of caustic soda and water. The grease and rosin being lighter than the lye, the outlets of their pipes *e f* extend below that of *g*, in order that they may be acted upon by agitators I J, the weight of the lye being sufficient to carry it to the bottom of the receptacle G in which they are placed, by which arrangement the several ingredients are thoroughly mixed together. The pipe *f*, leading from the receptacle E, is surrounded by another pipe, *k*, an interval being left between them to allow the steam from the chamber *c* to circulate around the pipe *f* and keep it constantly warm, to insure the rosin being kept in a fluid state in its passage to the lower kettle G. The construction and operation of the agitators I J will now be described. K is a vertical shaft, provided with a bevel-wheel, L, which is revolved within suitable bearings, in the direction of the arrow 5, by the bevel-gear M, on one end of a horizontal shaft, N, which is revolved in bearings *n* by power applied to the driving-wheel O, secured to its other end. The lower end of the vertical shaft K extends to near the bottom of the inside of the receptacle G containing the ingredients to be mixed, and carries the agitator or mixer I, provided with arms or projections *o*. (See Fig. 4.) Surrounding the shaft K is a hollow shaft, P, to the top of which is secured a bevel-gear, Q, which is revolved in the direction of the arrow 6, by the bevel-gear M, the lower end of the shaft P, which carries the agitator J, of similar construction, to the agitator I. P is a short pipe, provided with a cock, *q*, by means of which the condensed steam may be drawn off from the chamber *c* of the receptacle G. The receptacles D E should also be furnished with similar pipes and cocks, and the pipes leading from these receptacles are provided with thermometers *r* to enable the operator to ascertain the temperature of the ingredients which flow through them.

A small quantity of soap of the desired quality being placed within the receptacle G, and the receptacles D E F being filled with their respective ingredients, steam is admitted into the pipes H. By operating the cocks $h\ i\ j$, the attendant standing on the floor C, is enabled to regulate the quantity of the several ingredients as they flow into the receptacle G, in which they are heated or boiled, and he is enabled to ascertain the temperature of the contents of the pipes $e\ f$ by means of the thermometers $r$.

The position occupied by the attendant is such that he can closely observe the color and consistency of the heated mixture, and thereby have perfect control over the successive stages of the operation of making the soap, and can ascertain to a nicety when the desired quality is produced, after which the faucet $b$ is opened and the soap in a semi-fluid state flows off continuously into frames or wagons ready to receive it, and is then cut up into cakes or bars of any required size or form, in a well-known manner.

By the employment of an apparatus constructed as above described, a continuous supply of soap of a better quality may be produced with much less labor, in a more expeditious manner, and without the dirt and inconvenience incident to the ordinary process of making soap, in which considerable delay is occasioned in waiting for it to boil to the proper consistency, and in baling out the contents of the kettle.

Instead of employing steam as an agent for boiling the contents of the receptacle G, a direct fire may be applied thereto, in which case its steam-jacket would not be required, and the jackets surrounding the receptacles D E may also be dispensed with without departing from the spirit of my invention.

What I claim as my invention, and desire to secure by Letters Patent, is—

1. Placing the several soap-forming ingredients in separate and independent receptacles D E F, with or without steam-jackets, and provided with pipes $e\ f\ g$ for conducting the ingredients to the receptacle G, in which they are heated, the supply of the ingredients thereto being regulated by suitable valves or stopcocks $h\ i\ j$, substantially as and for the purposes specified.

2. In connection with the above, the employment of agitators I J, operating substantially as forth.

CYRUS H. HARDY.

Witnesses:
N. W. STEARNS,
P. E. TESCHEMACHER.